(12) United States Patent
Araoka et al.

(10) Patent No.: US 6,434,331 B1
(45) Date of Patent: Aug. 13, 2002

(54) LENS BARREL

(75) Inventors: Nobuharu Araoka, Hachioji; Takeshi Ito, Hino; Shigeo Hayashi, Okaya, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/507,182

(22) Filed: Feb. 18, 2000

(30) Foreign Application Priority Data

Feb. 19, 1999 (JP) .......................................... 11-041933
Jan. 31, 2000 (JP) ....................................... 2000-022266

(51) Int. Cl.$^7$ ............................................. G03B 17/00
(52) U.S. Cl. .......................... 396/72; 396/79; 359/695; 359/700
(58) Field of Search ............................. 396/79, 82, 72, 396/83, 6; 359/695, 699, 701, 700

(56) References Cited

U.S. PATENT DOCUMENTS

| | | | | |
|---|---|---|---|---|
| 4,974,949 A | * | 12/1990 | Tanaka | 359/704 |
| 5,075,709 A | * | 12/1991 | Ueyama | 396/78 |
| 5,130,851 A | * | 7/1992 | Shirie | 359/700 |
| 5,255,124 A | * | 10/1993 | Iwamura | 359/694 |
| 5,337,187 A | * | 8/1994 | Fukino et al. | 359/699 |
| 5,517,361 A | * | 5/1996 | Inadome et al. | 359/684 |
| 5,546,234 A | * | 8/1996 | Yamanouchi | 359/700 |
| 5,760,972 A | * | 6/1998 | Fukino | 359/701 |
| 5,978,156 A | * | 11/1999 | Okada et al. | 359/699 |
| 6,035,136 A | * | 3/2000 | Hayashi et al. | 396/72 |

FOREIGN PATENT DOCUMENTS

| | | |
|---|---|---|
| JP | 5-119248 | 5/1993 |
| JP | 7-174956 | 7/1995 |
| JP | 8-211271 | 8/1996 |
| JP | 08-313788 | 11/1996 |
| JP | 9-113791 | 5/1997 |
| JP | 9-211294 | 8/1997 |
| JP | 10-123401 | 5/1998 |
| JP | 10-142475 | 5/1998 |
| JP | 10-197773 | 7/1998 |

* cited by examiner

Primary Examiner—David M. Gray
(74) Attorney, Agent, or Firm—Ostrolenk, Faber, Gerb & Soffen, LLP

(57) ABSTRACT

A lens barrel in accordance with the present invention has a stationary frame, a cam frame, a first lens frame, and a second lens frame. The cam frame has an external cam formed on the external surface thereof and an internal cam formed on the internal surface thereof. The first lens frame is freely movable in directions along an optical axis relative to the stationary frame when driven by the external cam of the cam frame. The second lens frame can freely slide in the optical-axis directions with its rotation restrained by the internal surface of the first lens frame when driven by the internal cam of the cam frame.

11 Claims, 6 Drawing Sheets

LENS BARREL

BACKGROUND OF THE INVENTION

1. Field of the Invention

The present invention relates to a lens barrel. More particularly, this invention is concerned with a collapsible lens barrel or zooming lens barrel having a plurality of movable frames, which hold groups of photographic lenses or the like, designed to independently move in directions along an optical axis.

2. Description of the Related Art

Photography apparatuses (hereinafter, generically, cameras) including an ordinary compact camera and an electronic still camera (hereinafter, an electronic camera) are usually carried for use. The compact camera uses, for example, a silver film to perform photography, while the electronic camera electrically records an image signal or image information output from an imaging means such as a charge-coupled device (CCD). How to improve the compactness of the cameras and duly improve the portability thereof is a significant task that must be tackled in designing the cameras.

Among the component members of the cameras, a lens barrel composed of a plurality of lens frames for holding a photographic optical system so that the photographic optical system can move in directions along an optical axis occupies a large part in terms of both the volume and weight. Designing the lens barrel itself compactly therefore contributes largely to improvement in the compactness and portability of the cameras.

In recent years, a so-called variable power photographic optical system (hereinafter, a zoom lens) capable of continuously varying a focal length has been adopted as a photographic optical system employed in many cameras. Moreover, there is an increasing demand for a higher image magnification realized with a higher power (zooming ratio).

For constructing a lens barrel for a zoom lens capable of offering a high power, numerous photographic lenses and numerous lens frames for holding the lenses are needed. This leads to an increase in the number of component members. The increase in the number of component members discourages the effort to design the zoom lens barrel compactly. Besides, when an attempt is made to realize a zoom lens offering a high power, the lens barrel holding the zoom lens must be designed large in size.

Various proposals have been made of a means for improving the portability of cameras while adopting the zoom lens. Various means including, for example, a collapsible lens barrel have been proposed for photographic lenses and put to practical use. In cameras having this kind of collapsible lens barrel for photographic lenses, a plurality of lens frames is movable to enter two states, that is, a photographic state in which photography can be performed and a non-photographic state (collapsed state) in which a camera is being carried.

In the cameras, part of the lens barrel projects forward from a camera body (photographic state) during photography. In contrast, for placing a camera in the non-photographic state so as to carry it, the plurality of lens frames constituting the lens barrel is moved mutually independently in order to narrow the space between adjoining lens frames. Besides, the lens barrel itself is stowed in the camera body (collapsed).

In a conventional collapsible lens barrel for photographic lenses, a plurality of elongated guide shafts is usually used as movement restraint members. The movement restraint members support movable frames such as lens frames movable within the lens barrel, guide the movements of the frames in directions along an optical axis, and restrain the movements of the frames in directions of rotation.

However, when the guide shafts are used as the movement restraint members for restraining the movements of the movable frames, the guide shafts themselves must have predetermined lengths. Bearing members for bearing the guide shafts must be arranged in the optical-axis directions. Consequently, the adoption of the guide shafts becomes a factor in crippling the effort to making the lens barrel compact and short.

Moreover, the elongated guide shafts are placed in a stationary frame for supporting the movable frames stowed in the lens barrel. This poses a problem in that the layout of the movable frames and a movable range thereof are limited.

In efforts to shorten the lens barrel, a lens barrel disclosed in, for example, Japanese Unexamined Patent Publication No. 7-174956 has the bearings of the guide shafts placed in another lens frame interposed between two lens frames holding two groups of photographic lenses. This means proposed in the patent publication is intended to thus shorten the guide shafts.

According to the means disclosed in the Japanese Unexamined Patent Publication No. 7-174956, a plurality of guide shafts is used to stabilize the movements of the lens barrel in the optical-axis directions. This also contributes to reduction in the length in the optical-axis directions of the lens barrel.

When guide shafts are used to support a plurality of lens frames, the lens frames must have predetermined lengths for ensuring engagement in predetermined states.

However, according to the means disclosed in the Japanese Unexamined Patent Publication No. 7-174956, the engagement length of each lens frame is reduced or any other means is adopted. This poses a problem in that a limit is set on the stableness of movements to be attained.

SUMMARY OF THE INVENTION

An object of the present invention is to provide a lens barrel for moving a plurality of lens frames in directions along an optical axis. More particularly, the lens barrel has the overall length thereof reduced without the necessity of making the structure thereof complex. Besides, the lens barrel can move the lens frames on a stable basis.

Briefly, according to the first aspect of the present invention, a lens barrel has a stationary frame, a cam frame, a first lens frame, and a second lens frame. The cam frame has an external cam formed on the external surface thereof and an internal cam formed on the internal surface thereof. The first lens frame is freely movable in directions along an optical axis relative to the stationary frame when driven by the external cam of the cam frame. The second lens frame can freely slide in the optical-axis directions with its rotation restrained by the internal surface of the first lens frame when driven by the internal cam of the cam frame.

Moreover, according to the second aspect of the present invention, a lens frame has first and second lens frames, a cam frame, and a driving means. The first and second lens frames are engaged with each other so that they can freely move in the optical-axis directions alone. The cam frame has an external cam formed on the external surface thereof for driving the first lens frame, and an internal cam formed on the internal surface thereof for driving the second lens frame. The driving means gives drive to rotate the cam frame.

According to the third aspect of the present invention, a lens barrel has a first lens frame and a second lens frame. The first lens frame is freely movable in the optical-axis directions relative to a stationary frame when driven by an external cam formed on the external surface of a cam frame. The second lens frame is freely movable in the optical-axis directions relative to the stationary frame when driven by an internal cam formed on the internal surface of the cam frame. The lens barrel also has a rectilinear movement restraint member realized with part of the first lens frame and part of the second lens frame. The rectilinear movement restraint member is characterized in that: when the first lens frame and second lens frame both move in an optical-axis direction, the rectilinear movement restraint member restrains the second lens frame from rotating relative to the first lens frame and permits the second lens frame to rectilinearly move over the internal surface of the first lens frame.

These objects and other objects of the present invention and the advantages thereof will be apparent from the description made below.

According to the present invention, there is provided a lens barrel for moving a plurality of lens frames in directions along an optical axis. More particularly, although the structure of the lens barrel is simple, the lens barrel will not interfere with stable movements of the lens frames but the lens barrel has the overall length thereof reduced.

BRIEF DESCRIPTION OF THE DRAWINGS

FIG. 6A is a conceptual diagram showing a camera placed in a non-photographic state with the movable frames placed in their collapsed states or located at their stowed positions;

FIG. 6B is a conceptual diagram showing the camera placed in a photographic state with the movable frames placed in their wide-angle states or located at their short focal-length (wide-angle) positions; and FIG. 6C is a conceptual diagram showing the camera located at a photographic position with the movable frames placed in their telephoto states or located at their long focal-length (telephoto) positions.

DESCRIPTION OF THE PREFERRED EMBODIMENT

An embodiment shown in FIG. 1 to FIG. 6C will be described by taking for instance a collapsible zoom lens barrel for photographic lenses employed in an electronic still camera or the like.

Figure 3:
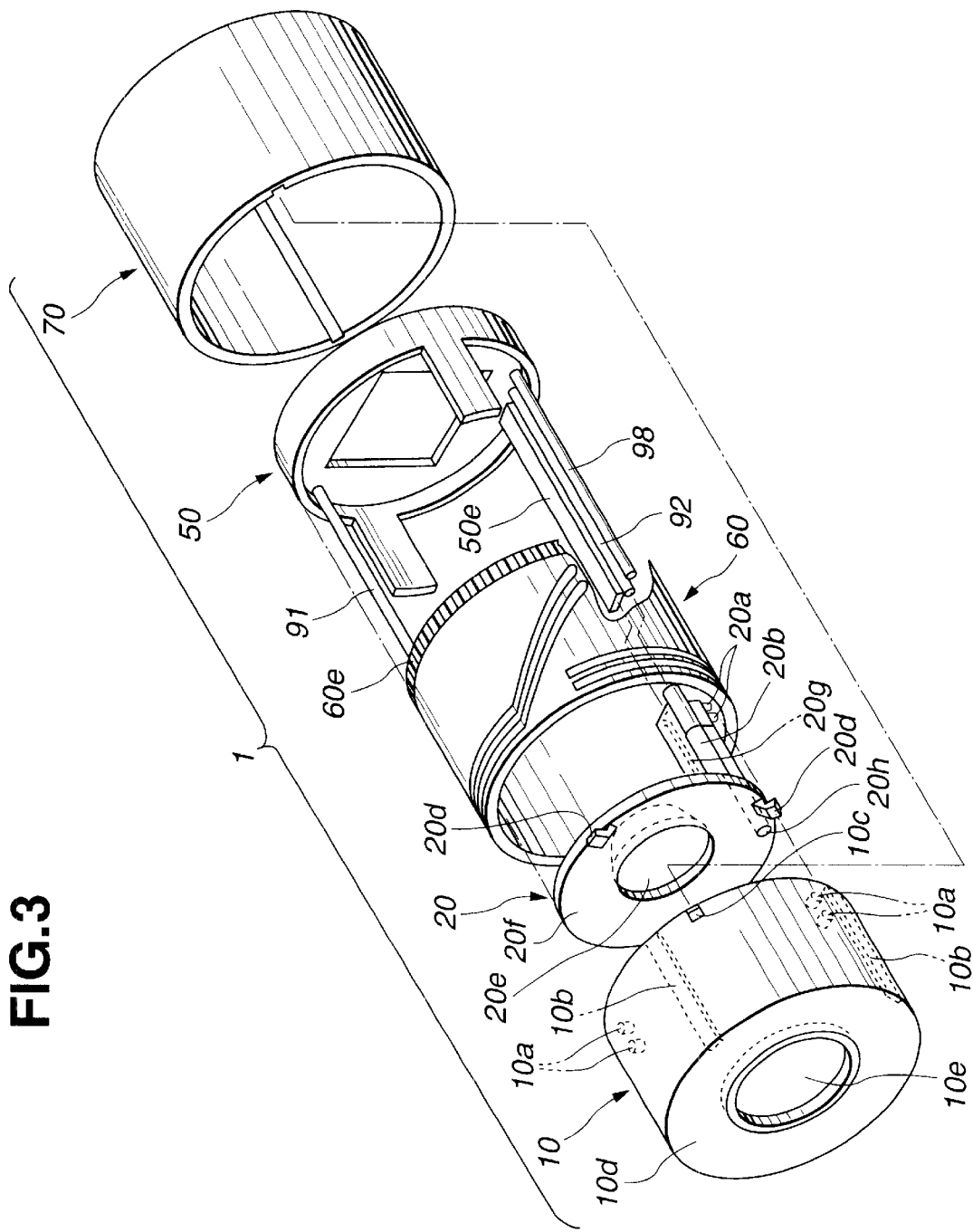
FIG. 3 is an exploded perspective view showing the structures of a first lens frame, a second lens frame, a cam frame, a stationary frame, and a mount frame that are included in the major component members of the lens barrel shown in FIG. 1.
Figure 4:
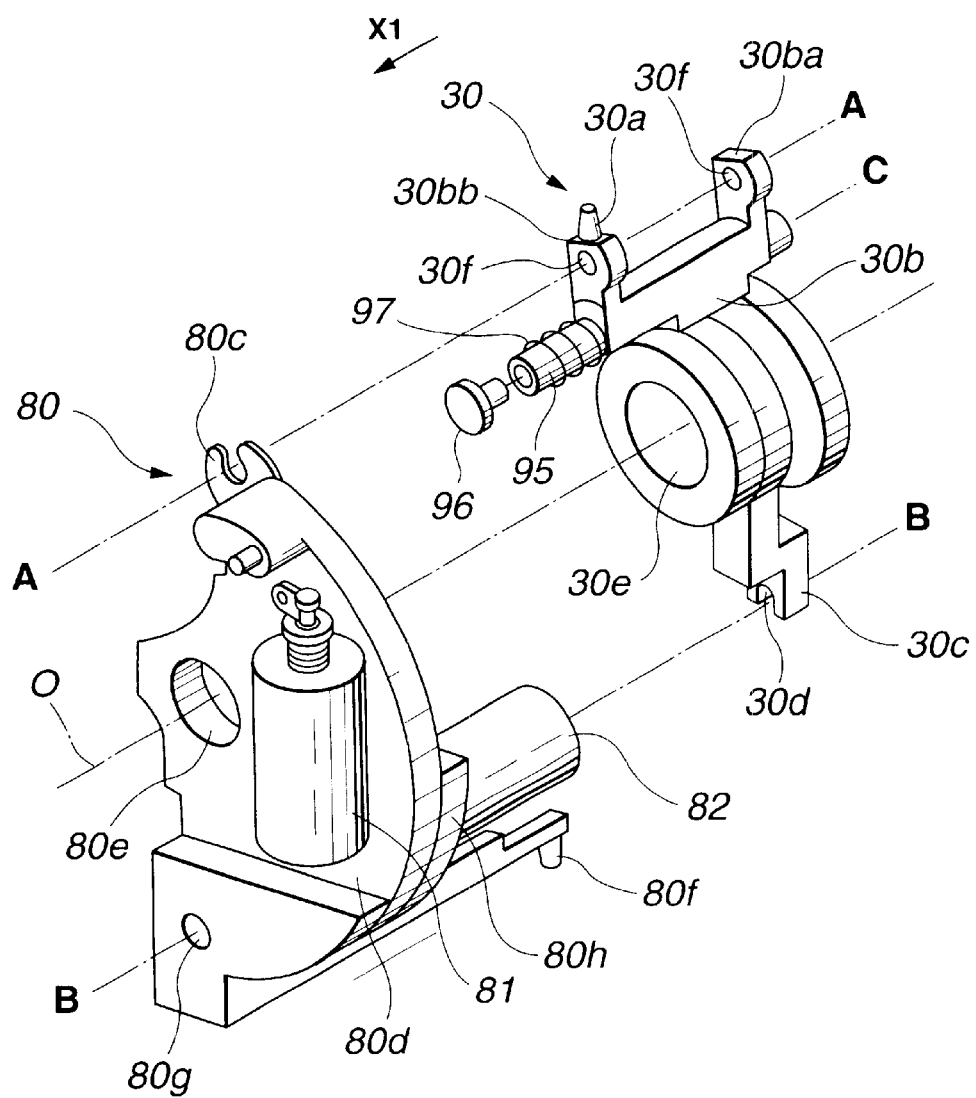
FIG. 4 is an exploded oblique view showing a shutter/diaphragm unit holding frame and a third lens frame that are included in the major component members of the lens barrel shown in FIG. 1.

In FIG. 3 and FIG. 4, for brevity's sake, a plurality of groups of photographic lenses lying in frame members and constituting a photographic optical system are not shown. FIG. 3 shows a cam frame in a cutaway manner.

Figure 1:
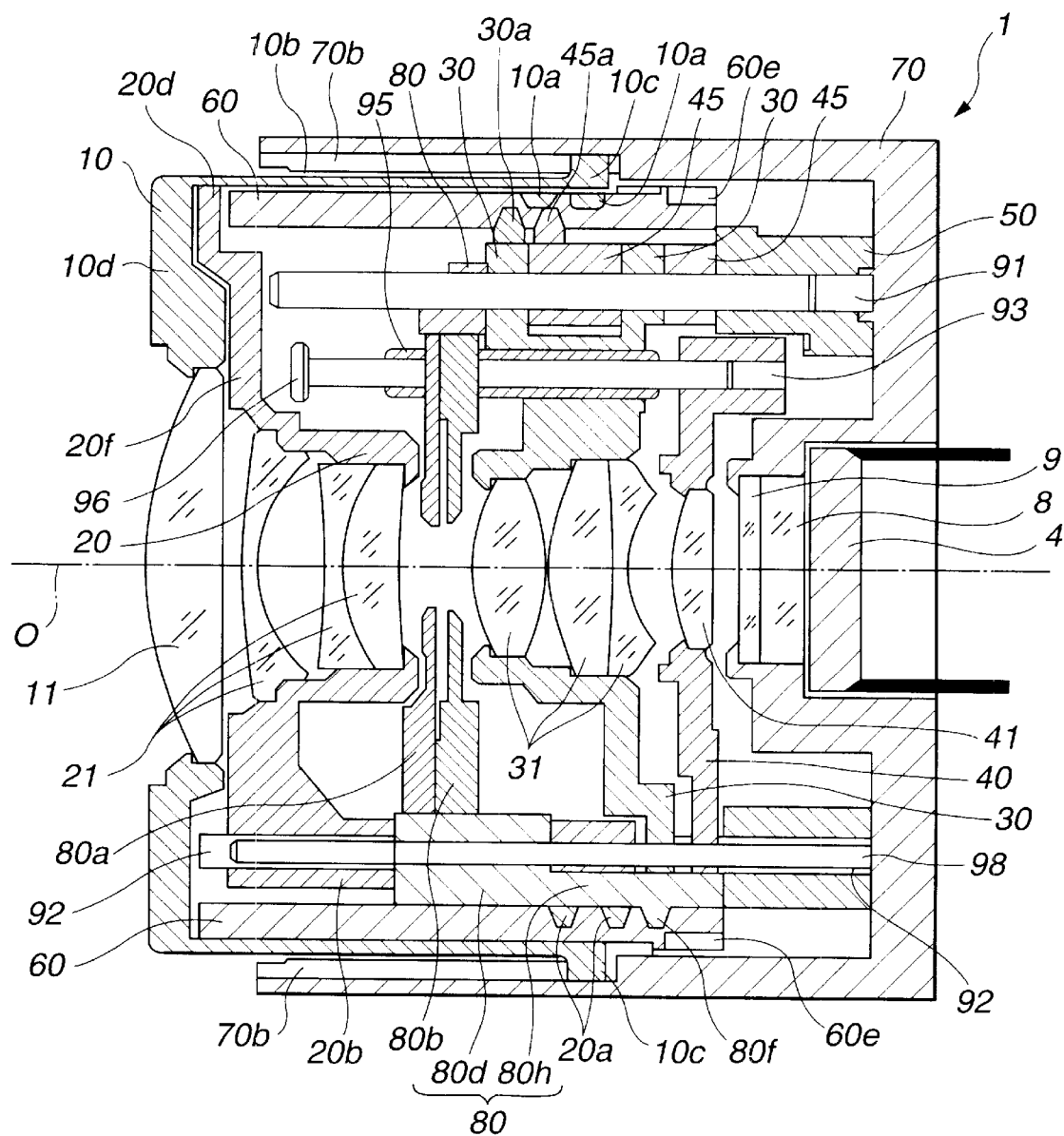
FIG. 1 is a longitudinal sectional view showing the structure of a lens barrel in accordance with an embodiment of the present invention, wherein movable frames are stowed and located at their collapsed positions.
Figure 2:
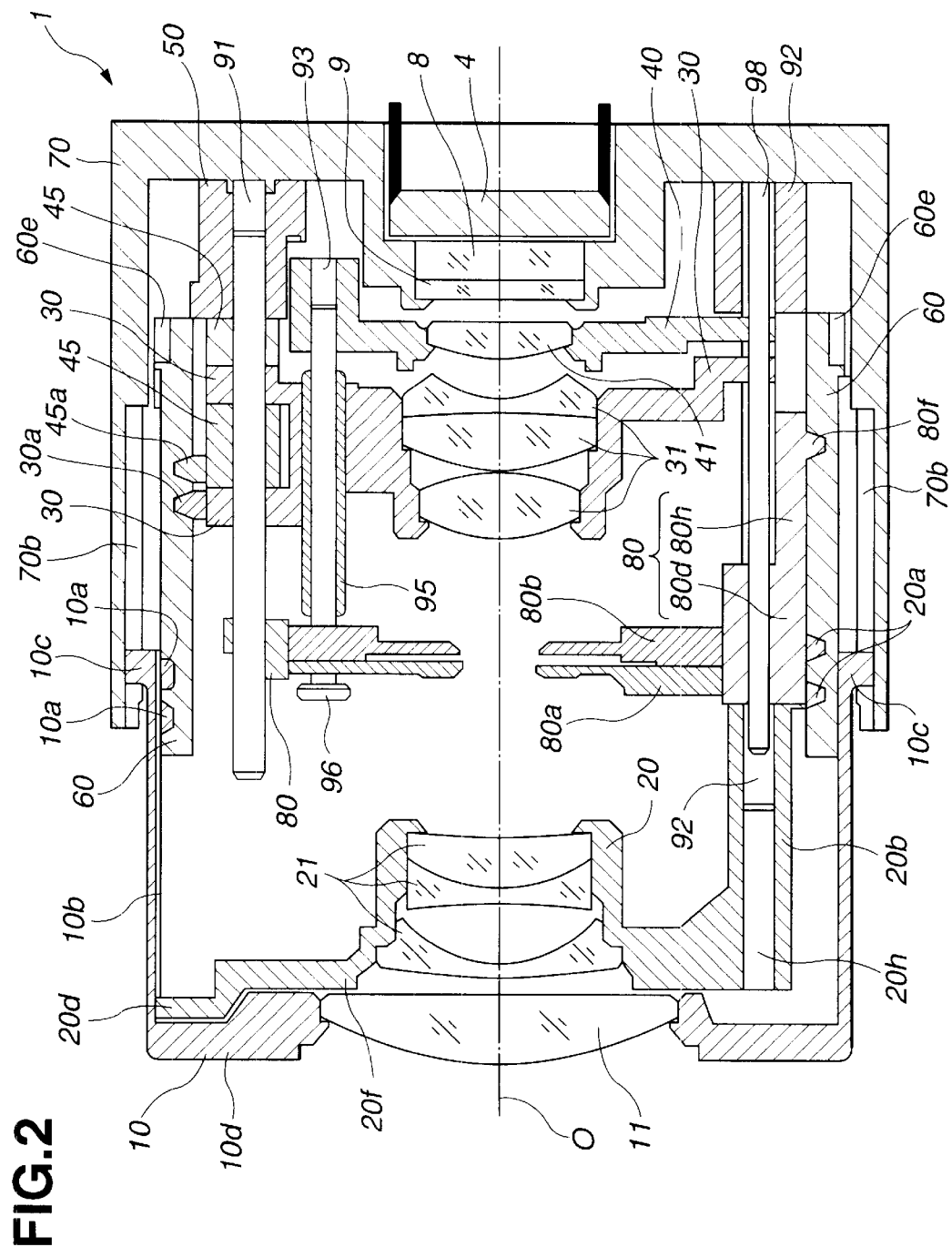
FIG. 2 is a longitudinal sectional view showing the structure of the lens barrel in accordance with the embodiment of the present invention, wherein the movable frames are placed in their photographic states and. located at their short focal-length (wide-angle) positions.

As shown in FIG. 1 and FIG. 2, a lens barrel 1 in accordance with the present embodiment consists mainly of a plurality of groups of photographic lenses (first, second, third, and fourth groups of lenses 11, 21, 31, and 41), a plurality of lens frames (first, second, third, and fourth lens frames 10, 20, 30, and 40), a cam frame 60, a stationary frame 50, a fourth group assisting frame 45, a shutter/diaphragm unit holding frame (hereinafter an S frame) 80, and a mount frame 70. The plurality of groups of photographic lenses constitutes a photographic optical system for forming an object image. The plurality of lens frames holds the plurality of groups of photographic lenses independently. The cam frame 60 serves as a moving mechanism for moving the first, second, third, and fourth lens frames 10, 20, 30 and 40 by predetermined distances in directions along an optical axis O. The stationary frame 50 lies in the cam frame 60 and holds the second, third, and fourth lens frames 20, 30, and 40 so that the lens frames can freely slide in the directions along the optical axis O. The fourth group assisting frame 45 accommodates an AF motor 6 (not shown in FIG. 1 to FIG. 4)(see FIG. 6 to be referenced later). The shutter/diaphragm unit holding frame (S frame) 80 serves as a second movable frame for holding a light level adjustment device. The mount frame 70 accommodates an imaging device 4 such as a CCD, enables mounting of the lens barrel 1 on a camera body (not shown), and supports the first lens frame 20 so that the first lens frame can freely slide in the directions along the optical axis O.

The first, second, third, and fourth lens frames 10, 20, 30, and 40, the fourth group assisting frame 45, and the S frame 80 are movable frames that are movable in the optical-axis directions. The first, second, third, and fourth lens frames 10, 20, 30, and 40 are lens frames for holding the photographic optical system, while the fourth group assisting frame 45 and S frame 80 are auxiliary frames for holding other component members.

The light level adjustment device is a device for mechanically controlling an amount of light to be transmitted by the photographic optical system placed in the lens barrel 1. The light level adjustment device is composed of, for example, a shutter mechanism 80a and a diaphragm mechanism 80b.

The layout of the major frame members constituting the lens barrel 1 will be described briefly. As shown in FIG. 3, the second lens frame 20 and cam frame 60 are engaged with the interior of the first lens frame 10, which is located at the distal end of the lens barrel 1, in that order. At this time, the margin of the second lens frame 20 and the external surface of the cam frame 60 abut on the internal surface of the first lens frame 10. Moreover, such movable frames as the stationary frame 50, third lens frame 30, fourth lens frame 40, S frame 80, and fourth group assisting frame 45 (not shown in FIG. 3) are stowed in the cam frame 60. The first lens frame 10 is borne by the mount frame 70, which is located on the face of a camera body or the like, so that the first lens frame can freely slide in the directions along the optical axis O. Note that the mount frame 70 is placed on the external surface of the first lens frame 10.

The photographic optical system stowed in the lens barrel 1 of the present embodiment is, as mentioned above, composed of a plurality of groups (four groups) of photographic lenses. The groups of photographic lenses, that is, the first group of lenses 11, the second group of lenses 21, the third group of lenses 31, and the fourth group of lenses 41 are arranged in that order from the object side of the lens barrel 1. The first, second, third, and fourth groups of lenses 11, 21, 31, and 41 are held by the first lens frame 10, second lens frame 20, third lens frame 30, and fourth lens frame 40 respectively.

The first lens frame 10 is, as shown in FIG. 3, formed with a substantially cylindrical member, and has a holding portion 10d. The holding portion 10d has an opening 10e, in which the first group of lenses 11 is locked, bored substantially in the center thereof.

Two key portions 10c (one of which is shown in FIG. 3) serving as first guide members are jutted outward from positions, which are separated from each other by substantially 180°, near the rear edge of the external surface of the first lens frame 10. The two key portions 10c are fitted in keyhole grooves 70b that are guide grooves bored in the internal surface of the mount frame 70 (see FIG. 3). The movements of the first lens frame 10 in directions of rotation are thus restrained.

By the way, three pairs of first cam pins 10a serving as first cam fitting members are jutted inward from positions, which are separated from one another by substantially 120°, near the rear edge of the internal surface of the first lens frame 10. The three pairs of first cam pins 10a are fitted in predetermined cam portions (grooves) bored in the external surface of the cam frame 60. The first lens frame 10 is therefore moved by a predetermined distance in the optical-axis directions along with the rotation of the cam frame 60.

Moreover, rectilinear guide grooves 10b serving as rectilinear guide portions for guiding the movements of the second lens frame 20 in the optical-axis directions are bored at positions, which are separated from each other by substantially 120°, in the internal surface of the first lens frame 10. Three second guide members 20d formed in the margin of the second lens frame 20 and serving as fitting members are fitted in the rectilinear guide grooves 10b. The first lens frame 10 thus supports the second lens frame 20 so that the second lens frame can slide freely, and guides the movements of the second lens frame in the directions along the optical axis O. Besides, the first lens frame 10 restrains the second lens frame 20 from rotating. At the same time, the first lens frame 10 restrains the second lens frame 20 from moving in directions parallel to a plane orthogonal to the optical axis O. Thus, so-called optical-axis mismatching is prevented.

The second lens frame 20 is, as shown in FIG. 3, a movable frame made by unifying a disk member 20f and an arm portion 20b serving as a bearing and extending backward in parallel with the optical axis. An opening 20e in which the second group of lenses 21 is locked is bored substantially in the center of the disk member 20f. Three second guide members 20d are jutted outward from position, which are separated from one another by substantially 120°, in association with the rectilinear guide grooves 10b in the first lens frame 10.

The second lens frame 20 is inserted into the first lens frame 10 from behind the first lens frame. At this time, the second guide members 20d are fitted in the rectilinear guide grooves 10b in the first lens frame 10. Consequently, as mentioned above, the second lens frame 20 is restrained from rotating but permitted to freely slide in the optical-axis directions.

Moreover, the arm portion 20b of the second lens frame 20 has a passage hole 20h and a fitting support section 20g. A second guide shaft 92 having one end thereof embedded in the stationary frame 50 is passed through the passage hole 20h. The fitting support section 20g has a guide groove, which supports a cantilevered arm member 50e extending from the stationary frame 50 so that the arm member can slide freely, bored therein.

A pair of second cam pins 20a is jutted outward from near the rear end of the arm portion 20b. The pair of second cam pins 20a is fitted in predetermined cam grooves bored in the internal surface of the cam frame 60.

In other words, the second lens frame 20 has the second guide shaft 92 passed through the passage hole 20h thereof. The arm member 50e of the stationary frame 50 is supported by the fitting support section 20g. The second lens frame 20 is therefore supported so that it can slide freely in the directions along the optical axis O relative to the stationary frame 50. At the same time, the second cam pins 20a are fitted in the predetermined cam portions (grooves) in the internal surface of the cam frame 60. The second lens frame 20 can therefore move by a predetermined distance only in the optical-axis directions along with the rotation of the cam frame 60.

The S frame 80, third lens frame 30, and fourth lens frame 40 (not shown in FIG. 3) (see FIG. 1, FIG. 2, and FIG. 4) are located behind the second lens frame 20 and supported by the stationary frame 50 located behind them so that they can slide freely.

The S frame 80 is, as shown in FIG. 4, a movable frame composed of a plate member 80d shaped substantially like a half moon and an arm member 80h extending backward. An opening 80e having a predetermined diameter with the optical axis O of the photographic optical system as a center is bored substantially in the center of the plate member 80d. Component members such as the shutter mechanism 80a and diaphragm mechanism 80b realized with, for example, a shutter plunger 81 and a diaphragm plunger 82 respectively are arranged neatly at predetermined positions on the plate member 80d in such a manner that the opening 80e will not be blocked.

The arm member 80h is a cantilevered member projecting backward from a predetermined position near the lower margin of the place member 80d. A second passage hole 80g through which a fourth guide shaft 98 having one end thereof embedded in the stationary frame 50 is passed is bored in the arm member 80h (see an alternate long and two short dashes line B in FIG. 4).

Located at a predetermined position near the upper margin of the plate member 80d and separated by substantially 180°from the arm member 80h is a fitting support member 80c having a notch shaped substantially like letter U. A first guide shaft 91 having one end thereof embedded in the stationary frame 50 is engaged with the fitting support member 80c (see an alternate long and two short dashes line A in FIG. 4). The S frame 80 is supported by the first guide shaft 91 and fourth guide shaft 98 so that the S frame can freely slide in the directions along the optical axis O relative to the stationary frame 50, and restrained from rotating.

A fifth cam pin 80f is projecting outward from near the tip of the arm member 80h. The fifth cam pin 80f is fitted in a predetermined cam groove bored in the internal surface of the cam frame 60.

The third lens frame 30 is, as shown in FIG. 4, a movable frame made by unifying a main member shaped substantially line a cylinder and upper and lower support members 30*b* and 30*c*. The main member has an opening 30*e*, in which the third group of lenses 31 is locked, bored substantially in the center thereof. A U-shaped notch 30*d* having substantially the same diameter as the fourth guide shaft 98 is bored in the lower part of the lower support member 30*c* (see the alternate long and two short dashes line B in FIG. 4).

Support sections 30*ba* and 30*bb* are projecting outward (upward) from the rear and distal ends of the upper support member 30*b* of the third lens frame 30. The support sections 30*ba* and 30*bb* have a passage hole 30*f* through which the first guide shaft 91 is passed (see an alternate long and two short dashes line A in FIG. 4). The first guide shaft 91 thus guides the movements of the third lens frame 30 in the optical-axis directions.

The fourth guide shaft 98 is fitted in the U-shaped notch 30*d* of the lower support member 30*c*, and the first guide shaft 91 is passed through the passage holes 30*f* of the support sections 30*ba* and 30*bb*. The lens frame 30 is thus supported to be able to freely slide in the directions along the optical axis O. Besides, the third lens frame 30 is restrained from rotating about the optical axis.

Moreover, a third cam pin 30*a* is projecting outward from the support section 30*bb* formed at the distal end of the support member 30*b*. The third cam pin 30*a* is fitted in a predetermined cam groove bored in the internal surface of the cam frame 60.

A sleeve 95 serving as a bearing means formed with a separate sleeve member is fixed near the proximal end of the upper support member 30*b* of the third lens frame 30. A third guide shaft 93 having one end thereof embedded in the fourth lens frame 40 is passed through the sleeve 95 (see an alternate long and two short dashes line C in FIG. 4). The sleeve 95 is included for more strictly achieving optical positioning of the fourth lens frame 40 relative to the third lens frame 30.

A constraining member 97 such as a stretchy coil spring is wound about the distal part of the third guide shaft 93 distal to the sleeve 95. A lid member 96 is attached to the tip of the third guide shaft 93, thus preventing the constraining member 97 from coming off. The constraining member 97 therefore constrains the fourth lens frame 40 via the third guide shaft 93 to move in a direction of arrow X1 in FIG. 4.

The fourth lens frame 40 (See FIG. 1 and FIG. 2) is a movable frame made by unifying a plate member shaped substantially like a disk and upper and lower support members. The plate member has an opening, in which the fourth group of lenses 41 is locked, bored substantially in the center thereof. A U-shaped notch having substantially the same diameter as the fourth guide shaft 98 is bored in the distal part of the lower support member in the same manner as that in the third lens frame 30. The fourth guide shaft 98 is fitted in the U-shaped notch, thus restraining the fourth lens frame 40 from rotating.

The end of the third guide shaft 93 is embedded in the upper support member of the fourth lens frame 40 so that the third guide shaft 93 will lie substantially in parallel with the optical axis O. As mentioned above, the third guide shaft 93 is passed through the sleeve 95 fixed to the third lens frame 30, thus guiding the movements of the fourth lens frame 40 in the optical-axis directions.

An escape hole 40*a* through which an axis of rotation 6*a* (not shown) of the AF motor 6 accommodated by the fourth group assisting frame 45 is passed with a clearance preserved is bored near the third guide shaft 93 (see FIG. 5 to be referenced later).

The fourth group assisting frame 45 is a movable frame for holding the AF motor 6 for moving the fourth lens frame 40 in the directions along the optical axis O. The fourth group assisting frame 45 is located at a position off the optical axis O for fear a light beam propagating through the lens barrel 1 may be intercepted. The axis of rotation 6*a* of the AF motor 6 (see FIG. 5) extends backward substantially in parallel with the optical axis O within the fourth group assisting frame 45.

Figure 5:
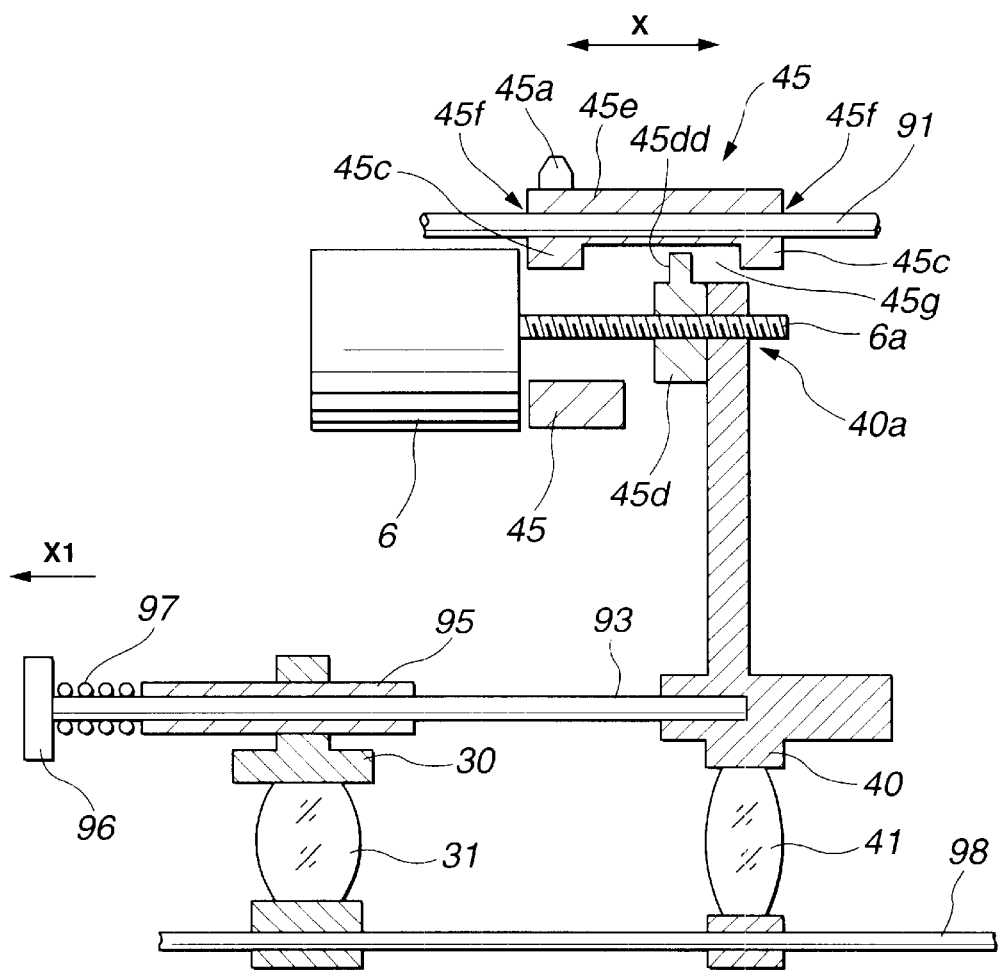
FIG. 5 is a sectional view conceptually showing the joined states of a fourth group assisting frame 45 and a fourth lens frame 40 included in the lens barrel shown in FIG. 1, and the joined states of the fourth lens frame 40 and third lens frame 30 included therein.

FIG. 5 is a sectional view conceptually showing the joined states of the fourth group assisting frame 45 and fourth lens frame 40 and the joined states of the fourth lens frame 40 and third lens frame 30.

As shown in FIG. 5, a support member 45*e* is located as a peripheral part of the fourth group assisting frame 45. An arm portion 45*c* having a passage hole 45*f*, through which the first guide shaft 91 is passed, is formed at the distal and rear ends of the support member 45*e*. The fourth group assisting frame 45 therefore moves in the optical-axis directions while being supported by the first guide shaft 91.

A fourth cam pin 45*a* is projecting upward from a predetermined position near the distal end of the support member 45*e*. The fourth cam pin 45*a* is fitted in a predetermined cam groove bored in the cam frame 60.

A through groove 45*g* is bored in the support member 45*e* of the fourth group assisting frame 45. A jut 45*dd* of a nut 45*d* screwed to the axis of rotation 6*a* of the AF motor 6 is fitted in the through groove 45*g*. When the AF motor 6 is rotated, the nut 45*d* moves in the directions along the optical axis O, that is, in the directions of arrow X in FIG. 5.

As mentioned above, the lid member 96 is always constrained to move towards an object (in the direction of arrow X1 in FIG. 5) by means of the constraining member 97. The fourth lens frame 40 is therefore constrained to move in the same direction owing to the third guide shaft 93 unified with the lid member 96. A this time, the outer wall surface near the escape hole 40*a* abuts on the surface of the nut 45*d* facing the outer wall surface. This restricts the position of the fourth lens frame 40. The position of the fourth lens frame 40 is determined based on the number of rotations made by the AF motor 6 owing to the nut 45*d*.

In other words, when the AF motor 6 is driven to rotate, the fourth lens frame 40 moves. Focusing is thus achieved. At this time, the fourth lens frame 40 can be stopped at a predetermined position by adjusting the number of rotations to be made by the AF motor 6. The photographic optical system may thus be focused.

When the cam frame 60 is rotated, the fourth lens frame 40 is moved in the optical-axis directions owing to the cam pin 45*a* of the fourth group assisting frame 45.

A guide convex part (not shown) is projecting from the margin of the fourth group assisting frame 45. The guide convex part is fitted in a guide concave groove lying at a predetermined position in the internal surface of the stationary frame 50 in parallel with the optical axis O so that the guide convex part can slide freely. The fourth group assisting frame 45 is therefore restrained from rotating owing to the guide convex part fitted in the guide concave groove and the first guide shaft 91 passed through the passage hole 45*f* of the support member 45*e*.

The cam frame 60 is, as shown in FIG. 3, formed with a substantially cylindrical member, and serves as a moving mechanism for causing the aforesaid movable frames to move by predetermined distances. The cam frame 60 has a predetermined number of cam grooves, which have predetermined shapes, bored in the internal surface and external surface thereof. The cam grooves cause the movable frames such as the first, second, third, and fourth lens frames 10, 20, 30, and 40 and the S frame 80 to move by predetermined distances in the optical-axis directions. The layout of the cam grooves has no direct relation to the present invention. The details of the layout will therefore be omitted.

A gear portion 60e is formed in the rearmost edge on the external surface of the cam frame 60. A cam frame driving means (not shown) realized with a driving means such as a zoom motor (not shown) or a driving force conveying means is meshed with the gear portion 60e, whereby the cam frame 60 is rotated.

The stationary frame 50 is, as shown in FIG. 3, a frame member shaped like a truncated cylinder having a rectangular opening substantially in the center thereof and located near the rear end of the cam frame 60 inside the cam frame 60. One ends of the first, second, and fourth guide shafts 91, 92, and 98 and the arm member 50e are, as mentioned above, extended forward from the stationary frame 50 along the optical axis O. The stationary frame 50 supports the third lens frame 30, fourth lens frame 40, fourth group assisting frame 45, S frame 80, and second lens frame 20 so that these frames can slide freely in the directions along the optical axis O.

Moreover, the stationary frame 50 is fixed to and borne by the mount frame 70 located behind the stationary frame 50 using fastening means, for example, attaching screws.

A cam frame driving means (not shown) is located at a predetermined position off the optical axis O inside the stationary frame 50. The cam frame driving means consists of a driving source (zoom motor or the like) and a driving force conveying means such as a planetary gear train. The driving source generates driving force with which the cam frame 60 is rotated so that predetermined actions will be performed in the lens barrel 1 for varying a power (zooming). An ordinary structure is adopted as the structure of the driving force conveying means. The details of the structure will therefore be omitted.

The mount frame 70 is shaped substantially like a cylinder. An infrared cut filter 9, a low-pass filter 8, and an imaging device 4 such as a CCD are arranged near the substantial center of the rearmost end surface of the mount frame 70. The infrared cut filter 9 removes an infrared component from an object light beam transmitted by the photographic optical system in the lens barrel 1. The low-pass filter 8 removes a high-frequency component from the object light beam transmitted by the infrared cut filter 9. The imaging device 4 converts a light beam expressing an object image (referred to as an object light beam) into an electric signal. Members constituting an imaging system, such as, the imaging device 4, infrared cut filter 9, and low-pass filter 8 are arranged to be substantially orthogonal to the optical axis O of the photographic optical system accommodated by the lens barrel 1.

The keyhole grooves 70b associated with the two key portions 10c of the first lens frame 10 are, as mentioned above, bored in the internal surface of the mount frame 70. The first lens frame 10 is thus supported to be able to freely slide in the directions along the optical axis O, and restrained from moving in directions of rotation.

The mount frame 70 is mounted and fixed onto a camera body frame (not shown) using fastening means such as attaching screws. The mount frame 70 thus fills the role of a coupling means for coupling the lens barrel 1 to a camera or the like (not shown).

Owing to the aforesaid structure, the six movable frames, that is, the first, second, third, and fourth lens frames 10, 20, 30, and 40, the S frame 80, and the fourth group assisting frame 45 are moved with driving force exerted by a zoom motor or the like via the cam frame 60 serving as a moving mechanism.

Moreover, the fourth lens frame 40 is moved by the AF motor 6 mounted in the fourth group assisting frame 45. The movable frames are moved by predetermined distances in the optical-axis directions and set at predetermined positions.

Actions to be performed by the movable frames included in the lens barrel 1 having the foregoing structure will be described in conjunction with FIG. 6.

Figure 6A:
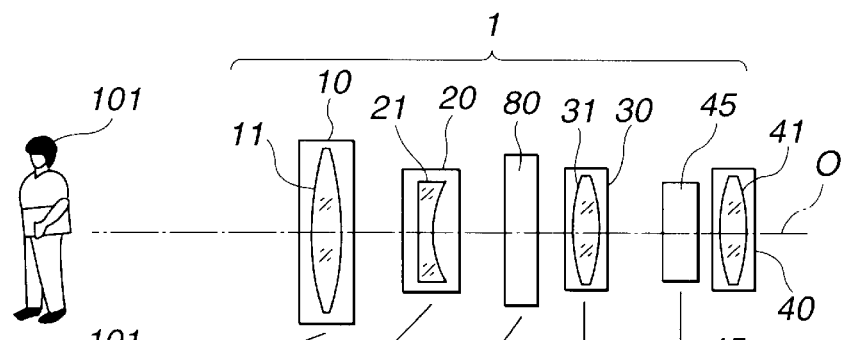
FIG. 6A to FIG. 6C are conceptual diagrams conceptually showing the positional relationships among the movable frames placed in predetermined states.

Assume that the lens barrel 1 mounted on a camera is collapsed (located at a non-photographic position or stowed position) as shown in FIG. 6A. When the main power supply is turned on, the camera is set to a photographic mode. The zoom motor (not shown) is driven responsively to the setting. The cam frame 60 makes a predetermined rotation accordingly. This causes the predetermined members included in the movable frames to start predetermined movements. The movable frames are then located at predetermined positions, that is, photographic positions (short focal-length positions) shown in FIG. 6B.

Figure 6B:
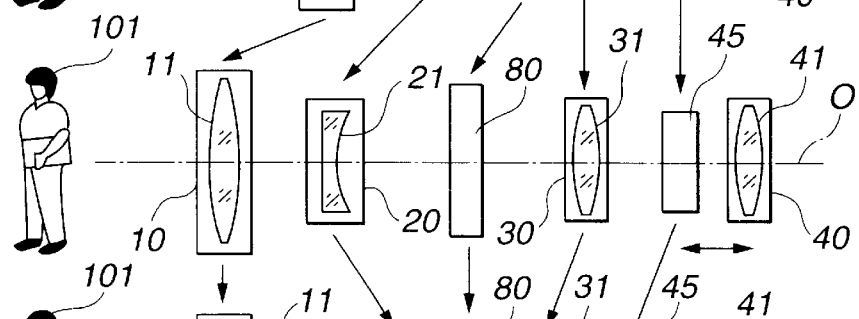

In this case, as shown in FIG. 6B, the first lens frame 10, second lens frame 20, and S frame 80 move along the optical axis O towards the object 101. In contrast, the third lens frame 30, fourth lens frame 40, and fourth group assisting frame 45 do not move.

Assume that in the state shown in FIG. 6B in which the movable frames are located at their photographic positions, if power variation (zooming) is executed. In this case, the movable frames are moved by predetermined distances in the directions along the optical axis O from their short focal-length positions shown in FIG. 6B to their long focal-length positions shown in FIG. 6C. However, the first lens frame 10 and S frame 80 do not move despite execution of power variation. Among the second lens frame 20, third lens frame 30, fourth lens frame 40, and fourth group assisting frame 45 that move in the directions along the optical axis O, the second and third lens frames 20 and 30 make predetermined movements so as to contribute to zooming. The fourth lens frame 40 and fourth group assisting frame 45 make predetermined movements so as to contribute to focusing.

Figure 6C:
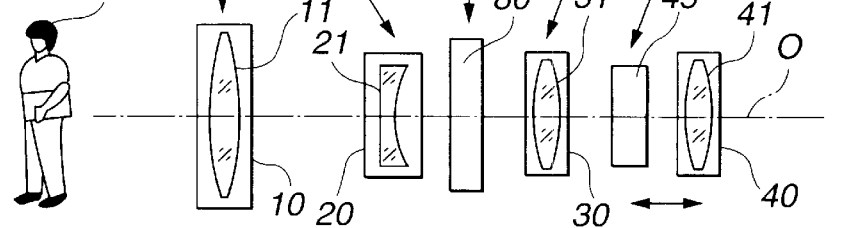

When located at intermediate positions between the positions shown in FIG. 6B and the positions shown in FIG. 6C, the fourth lens frame 40 and fourth group assisting frame 45 act differently from the other movable frames do. Specifically, the actions of the fourth lens frame 40 and fourth group assisting frame 45 are actions to be performed for adjusting a focus so as to adjust the focused state of the photographic optical system and bringing the photographic optical system into focus.

When the movable frames are located at the intermediate positions between the positions shown in FIG. 6B and the positions shown in FIG. 6C, the main power supply of the camera may be turned off in order to terminate photography. In this case, the movable frames including the lens frames for holding the groups of photographic lenses move to the stowed positions shown in FIG. 6A via the short focal-length positions shown in FIG. 6B. Consequently, the lens barrel 1 is collapsed.

The groups of photographic lenses make predetermined movements owing to operations exerted by the cam frame 60.

As described above, according to the embodiment, the first lens frame 10 has the rectilinear guide grooves 10b and the second lens frame 20 has the second guide members 20d, and the second guide members 20d are fitted in the rectilinear guide grooves 10b. The movements of the second lens frame 20 in the optical-axis directions are thus guided. Besides, the first lens frame 10 and second lens frame 20 are reliably positioned relative to each other. It can therefore be prevented that the optical axes of the first and second lens frames mismatch.

The second guide shaft 92 as well as the first lens frame 10 is utilized in order to restrain the second lens frame 20 from moving in the optical-axis directions and moving in the directions of rotation. A conventionally adopted anti-tilt mechanism including guide shafts is replaced with a means for moving both the first and second lens frames. This leads to a decrease in the number of guide shafts or obviates the necessity of the conventionally adopted plurality of guide shafts. The mechanism can therefore be simplified to the extent that the number of guide shafts is decreased or the necessity thereof is obviated. Moreover, the lens barrel itself can be shortened.

Moreover, since the second lens frame 20 has the second guide members 20d, it can be readily suppressed that the optical axis of the first lens frame 10 and the optical axis of the second lens frame 20 mismatch relative to each other.

As described so far in relation to the embodiment, the present invention can be implemented in any movable frames for holding facilities other than the lens frames for holding photographic lenses that must be positioned strictly precisely.

In the aforesaid embodiment, the shutter/diaphragm unit holding frame on which a shutter unit and a diaphragm unit are mounted is taken as an example of the second movable frame. The present invention is not limited to the shutter/diaphragm unit holding frame. Alternatively, an AF motor or the like may be mounted on a movable frame.

Moreover, the present invention can be implemented in a lens barrel designed to change from one state to the other. In the aforesaid embodiment, the present invention is implemented in a collapsible zoom lens barrel. However, the present invention is not limited to the collapsible zoom lens barrel but can also be implemented in a two-foci lens barrel or a lens barrel designed to switch normal photography and macrophotography.

In the present invention, it is apparent that a wide range of different embodiments can be formed based on the invention without a departure from the spirit and scope of the present invention. The present invention will be limited by the appended claims but not be restricted by any specific embodiment.

What is claimed is:

1. A lens barrel, comprising:
    a stationary frame;
    a cam frame having an external cam formed on the external surface thereof which does not extend through the body of the cam frame and an external cam formed on the internal surface thereof which does not extend through the body of the cam frame;
    a first lens frame freely movable in directions along an optical axis relative to said stationary frame when driven by said external cam of said cam frame;
    a second lens frame capable of freely sliding in the optical-axis directions with its rotation restrained by the internal surface of said first lens frame when driven by said internal cam of said cam frame.

2. A lens barrel according to claim 1, wherein said second lens frame is prevented from tilting when moving in the optical-axis directions owing to a guide shaft extending from said stationary frame.

3. A lens barrel according to claim 1, wherein said external cam and said internal cam are each composed of a plurality of cam grooves bored in parallel with each other, and said first lens frame and said second lens frame to be driven by said external cam and said internal cam respectively are each provided with a plurality of cam pins associated with said plurality of cam grooves.

4. A lens barrel according to claim 3, wherein said internal cam and said external cam are shaped so that lenses in said second lens frame and said first lens frame will not interfere with each other.

5. A lens barrel, comprising:
    first and second lens frames engaged with each other so that they can freely move only in directions along an optical axis;
    a cam frame having an external cam that is formed on the external surface thereof and does not extend through the body of the cam frame for driving said first lens frame, and an internal cam that is formed on the internal surface thereof and does not extend through the body of the cam frame for driving said second lens frame; and
    a driving means for giving drive to rotate said cam frame.

6. A lens barrel according to claim 5, wherein said internal cam and said external came formed on said cam frame are shaped so that lenses in said second lens frame and said first lens frame will not interfere with each other during movement.

7. A lens barrel according to claim 5, wherein said external cam and said internal cam are each composed of a plurality of cam grooves bored in parallel with each other, and said first lens frame and said second lens frame to be driven by said external cam and said internal cam respectively are each provided with a plurality of cam pins associated with said plurality of cam grooves.

8. A lens barrel, comprising:
    a first lens frame that is freely movable in directions along an optical axis relative to a stationary frame when driven by an external cam formed on the external surface, but not extending through the body, of a cam frame; a second lens frame that is freely movable in the optical-axis directions relative to the stationary frame when driven by an internal cam formed on the internal surface, but not extending through the body, of the cam frame;
    a rectilinear movement restraining member realized with part of said first lens frame and part of said second lens frame,
    wherein when said first lens frame and said second lens frame move in the optical-axis directions, said rectilinear movement restraining member restrains said second lens frame from rotating relative to said first lens frame but permits said second lens frame to rectilinearly move over the internal surface of said first lens frame.

9. A lens barrel according to claim 8, wherein said rectilinear movement restraining member is composed of guide grooves bored in the internal surface of said first lens frame and fitting members formed on the external surface of said second lens frame.

10. A collapsible zoom lens barrel for photographic lenses, comprising:
    a stationary frame having a cantilever guide shaft having one end embedded in said stationary frame and keyhole grooves provided in the internal surface thereof;

a cam frame having an external cam formed on the external surface thereof and an internal cam formed on the internal surface thereof;

a first lens frame having key portions, which are fitted in said keyhole grooves, provided on the external surface thereof and a plurality of rectilinear guide grooves provided in the internal surface thereof, said first lens frame being freely movable in directions along an optical axis by the engagement of said key portions thereof and said keyhole grooves of said stationary frame when driven by said external cam of said cam frame;

a second lens frame having a plurality of guide members which engage said plurality of rectilinear guide grooves, said second lens frame being capable of freely sliding in the optical-axis directions with its rotation restrained relative to said first lens frame by the engagement of said plurality of rectilinear guide grooves provided in the internal surface of said first lens frame and said guide members when driven by said internal cam of said cam frame and also permitted to move straight relative to said stationary frame by said cantilever guide shaft having one end thereof embedded in said stationary frame, wherein said first lens frame is permitted to move straight with its rotation restrained relative to said stationary frame by the engagement of said key portions and said keyhole grooves, and said second lens frame is capable of freely sliding in the optical-axis directions with its rotation restrained relative to said stationary frame and said first lens frame by a rectilinear movement restraining member which is composed of said rectilinear guide grooves and said plurality of guide members and said cantilever guide shaft.

11. A collapsible zoom lens barrel for photographic lenses, comprising:

a stationary frame having a cantilever guide shaft having one end embedded in said stationary frame and keyhole grooves provided in the internal surface thereof;

a cam frame having an external cam formed on the external surface thereof and an internal cam formed on the internal surface thereof;

a first lens frame having key portions, which are fitted in said keyhole grooves, provided on the external surface thereof and a plurality of rectilinear guide grooves provided in the internal surface thereof, said first lens frame being freely movable in directions along an optical axis by the engagement of said key portions thereof and said keyhole grooves of said stationary frame when driven by said external cam of said cam frame;

a second lens frame having a plurality of guide members which engage said plurality of rectilinear guide grooves, said second lens frame having a disk member capable of freely sliding in the optical-axis directions with its rotation restrained relative to said first lens frame by the engagement of said plurality of rectilinear guide grooves provided in the internal surface of said first lens frame and said guide members when driven by said internal cam of said cam frame, a bearing extending backward from said disk member in parallel with the optical axis, and a passage hole formed in said bearing through which is passed said cantilever guide shaft.

* * * * *

UNITED STATES PATENT AND TRADEMARK OFFICE
CERTIFICATE OF CORRECTION

PATENT NO. : 6,434,331 B1
DATED : August 13, 2002
INVENTOR(S) : Araoka et al.

It is certified that error appears in the above-identified patent and that said Letters Patent is hereby corrected as shown below:

Column 11,
Line 56, change "external" to -- internal --;

Signed and Sealed this

Fourth Day of March, 2003

JAMES E. ROGAN
*Director of the United States Patent and Trademark Office*